(12) United States Patent
Bolt et al.

(10) Patent No.: US 12,331,624 B2
(45) Date of Patent: Jun. 17, 2025

(54) CLOSE COUPLED FLUID PROCESSING SYSTEM

(71) Applicant: NATIONAL OILWELL VARCO, L.P., Houston, TX (US)

(72) Inventors: Travis Lee Bolt, Conroe, TX (US); Lewis Paul Callaway, College Station, TX (US); Eric O'Reilly Sears, College Station, TX (US); Jonathan Tyler Maxwell, Willis, TX (US)

(73) Assignee: NATIONAL OILWELL VARCO, L.P., Houston, TX (US)

(*) Notice: Subject to any disclaimer, the term of this patent is extended or adjusted under 35 U.S.C. 154(b) by 108 days.

(21) Appl. No.: 17/597,034

(22) PCT Filed: Jun. 30, 2020

(86) PCT No.: PCT/US2020/040338
§ 371 (c)(1),
(2) Date: Dec. 23, 2021

(87) PCT Pub. No.: WO2021/003179
PCT Pub. Date: Jan. 7, 2021

(65) Prior Publication Data
US 2022/0298905 A1  Sep. 22, 2022

Related U.S. Application Data (60) Provisional application No. 62/869,459, filed on Jul. 1, 2019.

(51) Int. Cl.
*E21B 43/26* (2006.01)
*E21B 43/267* (2006.01)
(Continued)

(52) U.S. Cl.
CPC ........ *E21B 43/2607* (2020.05); *E21B 43/267* (2013.01); *F16L 1/10* (2013.01); *F16L 27/127* (2019.08); *F16L 37/1205* (2013.01)

(58) Field of Classification Search
CPC ....... E21B 43/2607; F16L 1/10; F16L 27/127; F16L 37/1205
See application file for complete search history.

(56) References Cited

U.S. PATENT DOCUMENTS

| | | |
|---|---|---|
| RE19,132 E | 4/1934 | McGuirk et al. |
| 2,862,731 A | 12/1958 | Hedden et al. |

(Continued)

FOREIGN PATENT DOCUMENTS

| | | |
|---|---|---|
| CA | 2605260 C | 6/2011 |
| CN | 109025944 A | 12/2018 |

(Continued)

OTHER PUBLICATIONS

"U.S. Appl. No. 16/214,930, Advisory Action mailed Oct. 20, 2021", 4 pgs.

(Continued)

*Primary Examiner* — Atif H Chaudry
(74) *Attorney, Agent, or Firm* — Schwegman Lundberg & Woessner, P.A.

(57) ABSTRACT

A close coupled processing system may include a fluid processing system for producing frac fluid for frac operations, a fluid distribution system for distributing the frac fluid to a plurality of pressurization units, and a large bore fluid connection connecting the fluid processing system and the fluid distribution system.

18 Claims, 8 Drawing Sheets

(51) Int. Cl.
  *F16L 1/10* (2006.01)
  *F16L 27/12* (2006.01)
  *F16L 37/12* (2006.01)

(56) References Cited

U.S. PATENT DOCUMENTS

| | | | |
|---|---|---|---|
| 2,937,444 A | 5/1960 | Kern | |
| 3,458,219 A | 7/1969 | Wesch | |
| 3,572,380 A | 3/1971 | Jackson et al. | |
| 3,752,507 A | 8/1973 | Maurer et al. | |
| 3,776,578 A | 12/1973 | Jessup et al. | |
| 4,354,698 A | 10/1982 | Linder et al. | |
| 4,391,297 A | 7/1983 | Knight | |
| 4,496,176 A | 1/1985 | Weinhold | |
| 4,724,907 A * | 2/1988 | McClaflin | C09K 8/584 166/371 |
| 4,844,133 A | 7/1989 | Von Meyerinck et al. | |
| 5,577,775 A | 11/1996 | Pearson et al. | |
| 5,738,178 A | 4/1998 | Williams et al. | |
| 7,007,753 B2 | 3/2006 | Robichaux et al. | |
| 7,654,583 B2 | 2/2010 | Kvamme et al. | |
| 8,146,665 B2 | 4/2012 | Neal | |
| 8,590,556 B2 | 11/2013 | Kendrick | |
| 10,408,031 B2 | 9/2019 | Oehring et al. | |
| 2004/0094898 A1 | 5/2004 | Zheng | |
| 2009/0041588 A1 | 2/2009 | Hunter et al. | |
| 2010/0032031 A1 * | 2/2010 | Neal | E21B 43/26 166/381 |
| 2010/0310384 A1 | 12/2010 | Stephenson et al. | |
| 2010/0320699 A1 | 12/2010 | Takeda et al. | |
| 2012/0060929 A1 | 3/2012 | Kendrick | |
| 2012/0099954 A1 | 4/2012 | Teichrob et al. | |
| 2013/0284455 A1 | 10/2013 | Kajaria et al. | |
| 2014/0023463 A1 | 1/2014 | Oren | |
| 2014/0041317 A1 | 2/2014 | Pham et al. | |
| 2014/0048158 A1 | 2/2014 | Baca et al. | |
| 2014/0290768 A1 | 10/2014 | Randle et al. | |
| 2015/0000766 A1 | 1/2015 | Arizpe et al. | |
| 2015/0336747 A1 | 11/2015 | Teichrob et al. | |
| 2016/0102537 A1 | 4/2016 | Lopez | |
| 2016/0160889 A1 | 6/2016 | Hoffman et al. | |
| 2016/0170403 A1 | 6/2016 | Lopez et al. | |
| 2017/0016433 A1 * | 1/2017 | Chong | F04B 23/06 |
| 2017/0074074 A1 | 3/2017 | Joseph et al. | |
| 2017/0291780 A1 | 10/2017 | Sherwood et al. | |
| 2017/0334639 A1 | 11/2017 | Hawkins et al. | |
| 2018/0045331 A1 | 2/2018 | Lopez et al. | |
| 2018/0073308 A1 * | 3/2018 | Tran | E21B 33/068 |
| 2018/0187507 A1 | 7/2018 | Hill et al. | |
| 2018/0223640 A1 | 8/2018 | Keihany et al. | |
| 2018/0283151 A1 | 10/2018 | Cook et al. | |
| 2018/0284817 A1 | 10/2018 | Cook et al. | |
| 2018/0298731 A1 | 10/2018 | Bishop | |
| 2019/0003329 A1 * | 1/2019 | Morris | E21B 43/26 |
| 2019/0169971 A1 | 6/2019 | Oehring et al. | |
| 2020/0182385 A1 | 6/2020 | Westgarth et al. | |
| 2020/0355321 A1 | 11/2020 | Zerkus et al. | |
| 2021/0040830 A1 | 2/2021 | Mu et al. | |
| 2021/0354910 A1 | 11/2021 | Grimes et al. | |
| 2021/0396223 A1 | 12/2021 | Yeung et al. | |

FOREIGN PATENT DOCUMENTS

| | | |
|---|---|---|
| CN | 113167420 A | 7/2021 |
| EP | 1872047 A2 | 1/2008 |
| GB | 1258305 A | 12/1971 |
| GB | 2341653 A | 3/2000 |
| WO | WO-2013095123 A1 | 6/2013 |
| WO | 2017039692 A1 | 3/2017 |
| WO | WO-2018074995 A1 | 4/2018 |
| WO | 2019112554 A1 | 6/2019 |
| WO | 2019147603 A1 | 8/2019 |
| WO | WO-2020056360 A1 | 3/2020 |
| WO | WO-2020120512 A1 | 6/2020 |
| WO | WO-2021003178 A1 | 1/2021 |
| WO | WO-2021003179 A1 | 1/2021 |

OTHER PUBLICATIONS

"U.S. Appl. No. 16/214,930, Final Office Action mailed Aug. 2, 2021", 14 pgs.

"U.S. Appl. No. 16/214,930, Non Final Office Action mailed Jan. 26, 2021", 16 pgs.

"U.S. Appl. No. 16/214,930, Non Final Office Action mailed Dec. 13, 2021", 15 pgs.

"U.S. Appl. No. 16/214,930, Response filed Apr. 22, 2021 to Non Final Office Action mailed Jan. 26, 2021", 8 pgs.

"U.S. Appl. No. 16/214,930, Response filed Oct. 1, 2021 to Final Office Action mailed Aug. 2, 2021", 9 pgs.

"U.S. Appl. No. 16/214,930, Response filed Nov. 2, 2021 to Advisory Action mailed Oct. 20, 2021", 9 pgs.

"U.S. Appl. No. 16/214,930, Response filed Dec. 7, 2020 to Restriction Requirement mailed Oct. 7, 2020", 6 pgs.

"U.S. Appl. No. 16/214,930, Restriction Requirement mailed Oct. 7, 2020", 10 pgs.

"International Application Serial No. PCT/EP2019/084518, International Search Report mailed Mar. 9, 20", 5 pgs.

"International Application Serial No. PCT/EP2019/084518, Written Opinion mailed Mar. 9, 2020", 7 pgs.

"International Application Serial No. PCT/US2019/051158, International Preliminary Report on Patentability mailed Sep. 30, 2020", 4 pgs.

"International Application Serial No. PCT/US2019/051158, International Search Report mailed Jan. 6, 2020", 4 pgs.

"International Application Serial No. PCT/US2019/051158, Invitation to Pay Additional Fees mailed Oct. 28, 2019", 2 pgs.

"International Application Serial No. PCT/US2019/051158, Response filed Jul. 13, 20 to Written Opinion mailed Jan. 6, 2020", 3 pgs.

"International Application Serial No. PCT/US2019/051158, Written Opinion mailed Jan. 6, 2020", 6 pgs.

"International Application Serial No. PCT/US2020/040336, International Search Report mailed Sep. 25, 2020", 3 pgs.

"International Application Serial No. PCT/US2020/040336, Written Opinion mailed Sep. 25, 2020", 6 pgs.

"International Application Serial No. PCT/US2020/040338, International Preliminary Report on Patentability mailed Jul. 12, 2021", 7 pgs.

"International Application Serial No. PCT/US2020/040338, International Search Report mailed Sep. 25, 2020", 3 pgs.

"International Application Serial No. PCT/US2020/040338, Written Opinion mailed Sep. 25, 2020", 6 pgs.

"U.S. Appl. No. 17/247,769, Examiner Interview Summary mailed Apr. 22, 2022".

"U.S. Appl. No. 17/247,769, Response filed Apr. 25, 2022 to Non Final Office Action mailed Jan. 25, 2022".

"Saudi Arabian Application Serial No. 521431256, Substantive Examination Report mailed Jun. 20, 2023", W English Translation, 13 pgs.

"International Application Serial No. PCT/US2020/040336, International Preliminary Report on Patentability mailed Jan. 13, 2022", 8 pgs.

"U.S. Appl. No. 17/247,769, Non Final Office Action mailed Jan. 25, 2022", 10 pgs.

U.S. Appl. No. 16/214,930, Response filed Mar. 14, 2022 to Non Final Office Action mailed Dec. 13, 2021, 8 pgs.

"International Application Serial No. PCT/US2021/073083, International Search Report mailed Feb. 28, 2022", 6 pgs.

"International Application Serial No. PCT/US2021/073083, Written Opinion mailed Feb. 28, 2022", 6 pgs.

"Saudi Arabian Application Serial No. 521431256, Substantive Examination Report mailed Dec. 26, 2023", w/ English Translation, 11 pgs.

(56) References Cited

OTHER PUBLICATIONS

"Saudi Arabian Application Serial No. 521431256, Response Filed Apr. 25, 2024 to Substantive Examination Report mailed Dec. 26, 2023", w English claims, 23 pgs.

* cited by examiner

CLOSE COUPLED FLUID PROCESSING SYSTEM

CROSS-REFERENCE TO RELATED APPLICATIONS

The present application is a U.S. National Stage Filing under 35 U.S.C. 371 from International Application No. PCT/US2020/040338, filed Jun. 30, 2020, which claims priority to U.S. Provisional Patent Application No. 62/869,459 filed on Jul. 1, 2019 and entitled Close Coupled Fluid Processing System, the content of each which are hereby incorporated by reference herein in their entirety.

TECHNOLOGICAL FIELD

The present application relates to frac operations. More particularly, the present application relates to managing the delivery of fluid from a fluid preparation system to a fluid distribution system. Still more particularly, the present application relates to close coupled fluid processing system that allow for large bore connections between the fluid preparation system and the fluid distribution system in addition to cross communication between otherwise parallel running large bore connections.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Frac solutions for producing oil from oil wells continue to develop and new technologies and changes to systems, new systems, and varieties of equipment have been incorporated. However, the fundamental concept of frac operations is relatively rudimentary and involves forcing grit-filled fluid into a well at a sufficiently high pressure to crack the rock formation in the well. The grit-filled fluid then flows into the cracks and the grit gets stuck there, which holds the cracks open and allows oil to flow through the cracks and out of the well. Given this relatively rudimentary process, a lot can be accomplished by somewhat haphazardly stringing equipment together with hoses and power cords. As systems have gotten bigger and more powerful, more hoses and power cords have become necessary and have been added to the systems. Current Frac operations may commonly have a large number of frac pumps contributing to pressurize the frac fluid. Each pump may have a low-pressure fluid supply line and a power line supply the pump and each pump may also have a high-pressure fluid line leaving the pump to carry the high-pressure fluid to the well. The individual supply lines can allow for flexibility of pump locations and numbers. However, where 8, 10, 12, or more pumps are present on site, the litany of fluid and power lines draped across the site creates a messy, sometimes unorganized, potentially dangerous, and obstructive web on the ground and across the frac site.

For purposes of fluid management (e.g., fluid routing to selected pumps, etc.), fluid manifolds may be used to collect fluid from the fluid preparation system via multiple human handleable supply lines and then deliver the fluid to each frac pump using individual human handleable fluid supply lines. The litany of fluid lines create obstacles to and obstructions on the frac site and can expose each of them to puncture or other damage.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a close coupled processing system may include a fluid processing system for producing frac fluid for frac operations. The system may also include a fluid distribution system for distributing the frac fluid to a plurality of pressurization units. The system may also include a large bore fluid connection connecting the fluid processing system and the fluid distribution system.

In one or more other embodiments, a frac system may include a fluid processing system for producing frac fluid for frac operations. The system may also include a fluid distribution system for distributing the frac fluid to a plurality of pressurization units. The system may also include a large bore fluid connection connecting the fluid processing system and the fluid distribution system. The system may also include a power distribution system for distributing power to the plurality of pressurization units. The system may also include the plurality of pressurization units, wherein the pressurization units are configured to pressurize the frac fluid and deliver the frac fluid to a wellhead.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to a close coupled fluid processing system for frac operation. The close coupled system may allow for a reduction or elimination of hoses and manifolds between the fluid processing system and a fluid distribution system and, instead, may provide for direct large bore connections between these points. That is, where multiple parallel running manually handleable hoses have been used in the past to extend from a manifold on the fluid processing side to a manifold on the fluid distribution side, a direct large bore connection may be used in its place. The system may be equipped with features for creating 3-axis alignment and for accommodating discrepancies in angular alignment. The system may also provide for cross communication between parallel running large bore connections and may include a bolt less and/or automated connection system for connecting the large bore piping on the fluid processing side to the large bore piping on the fluid distribution side.

Figure 1:
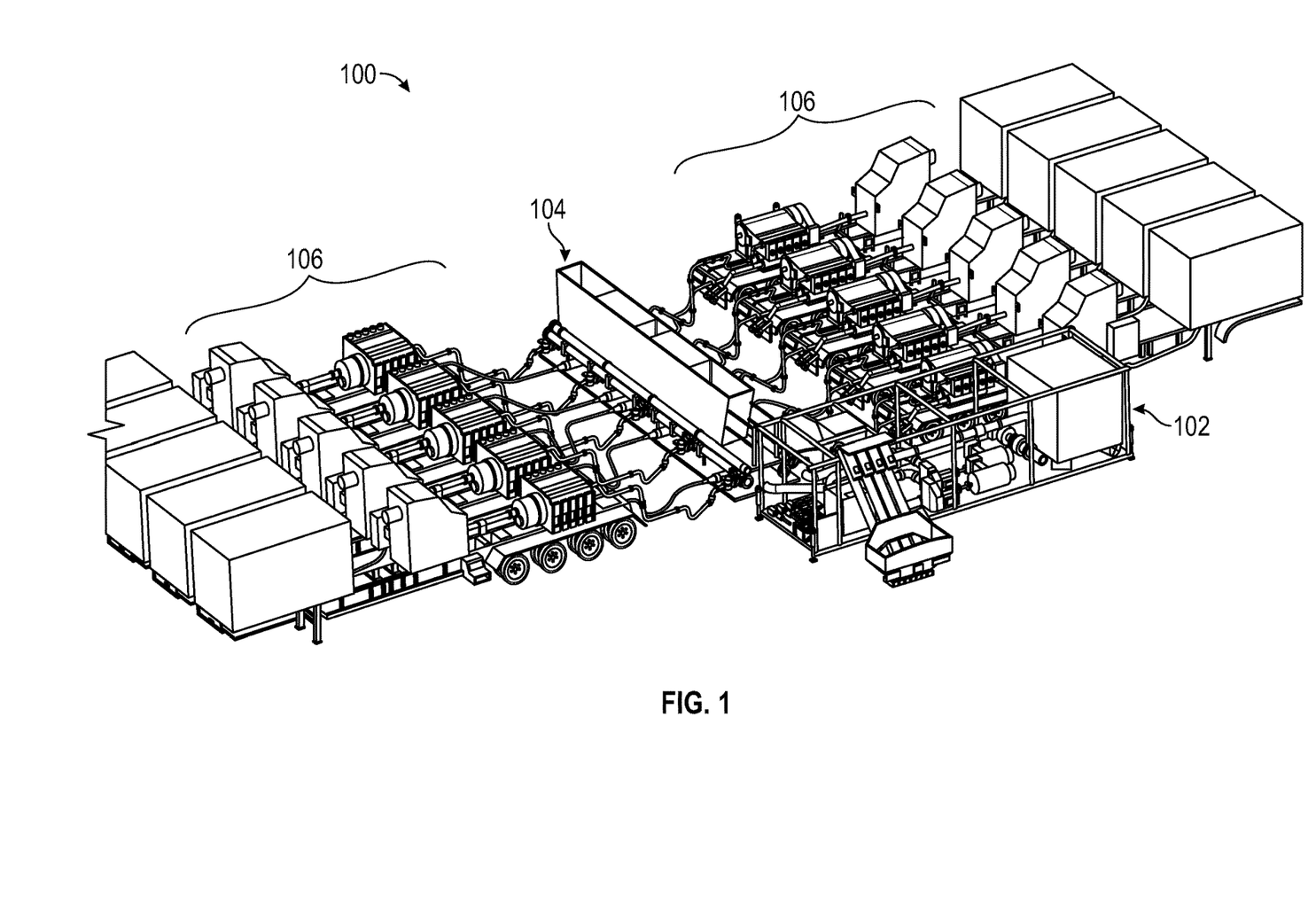
FIG. 1 is a perspective view of an e-frac system having close coupled fluid processing system, according to one or more embodiments.
Figure 3:
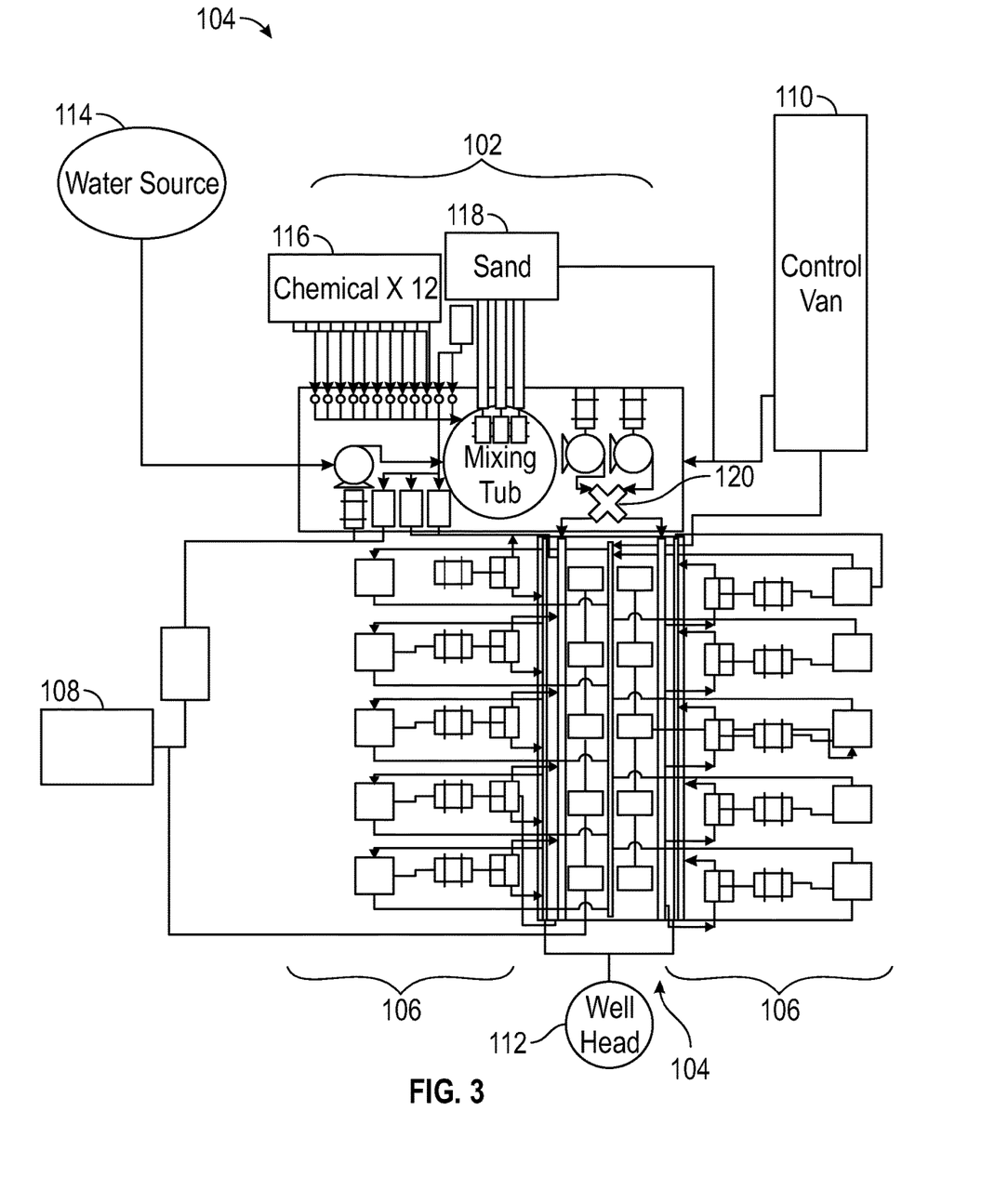
FIG. 3 is a layout where a close coupled fluid processing system is used, according to one or more embodiments.
Figure 6:
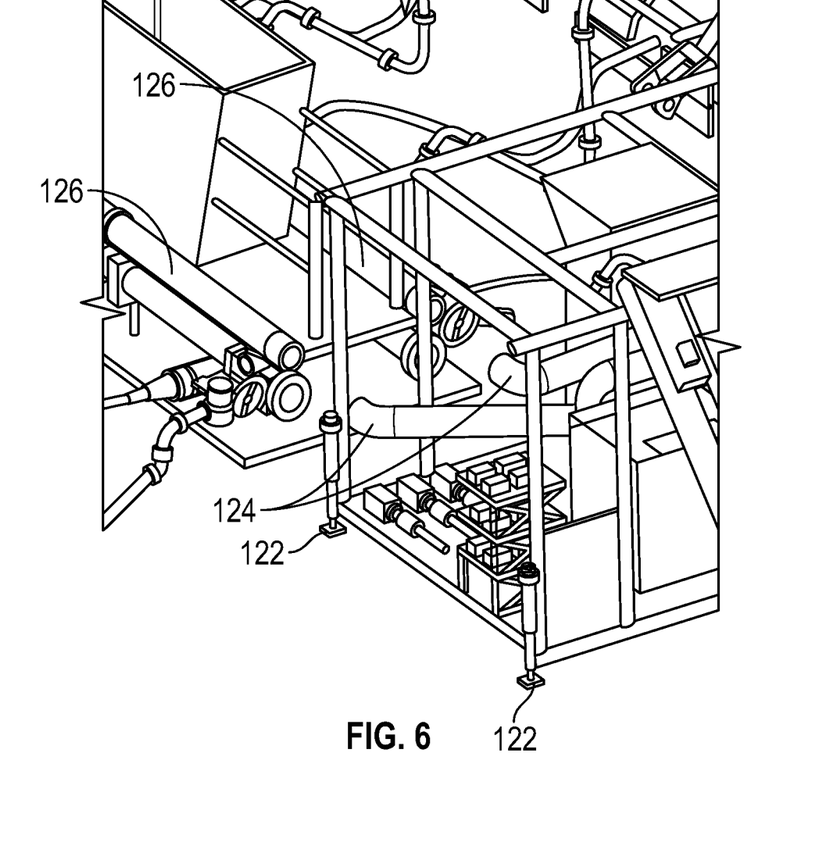
FIG. 6 is close up perspective view of the coupling area between the close coupled fluid processing system and the smart manifold.

FIG. 1 is a perspective view of an electrically powered frac system 100 ("e-frac system") having a fluid processing system 102, a power and fluid manifold system 104, and a series of pressurization units 106. The primary focus of the present disclosure may be on the connection between the fluid processing system 102 and the manifold system 104 as shown in FIGS. 1, 3, and 6. However, more broadly, and as shown in FIG. 3, the system may also include a power source 108 and a control system 110.

As may be appreciated, the power source 108 may include an electrical power source such as a gas turbine generator, grid power, or other electrical power source. The power source may be electrical communication with the manifold system and, in one or more embodiments, may be in direct electrical communication with the manifold system.

The control system 110 may be configured to control operations of several portions of the frac operation. For example, the control system 110 may control fluid preparation in the fluid processing system 102. The control system 110 may also control the delivery of the fluid to the manifold system 104, the increase of pressure of the fluid, and the delivery of the fluid to the well head 112. As such, the control system may be in signal communication (wired or wireless) with the fluid processing system and the manifold system.

The fluid processing system 102 may be responsible for preparing and delivering low pressure fluid to the system for use in frac operations. The fluid processing system 102 may include a water source 114, a chemical source 116, and a proppant source 118. The fluid processing system 102 may also include processing equipment for receiving water, chemicals, and proppant from their respective sources and for mixing the several inputs to a desired mixture/slurry for use in frac operations. The fluid processing system 102 may be in low pressure fluid communication with the manifold system 104 and the manifold system 104 may distribute the fluid to the several pressurization units 106.

The pressurization system 106 may be particularly configured to receive low pressure fluid and increase the pressure of the fluid to create high pressure fluid. For example, each pressurization unit in the pressurization system may include a motor, a controller such as a variable frequency drive ("VFD"), and a pump. The motor may drive the pump under the control of the VFD and may pressurize the low pressure fluid from the fluid processing system to create high pressure fluid for frac operations. For purposes of receiving the low pressure fluid and delivering the high pressure fluid, each of the pressurization systems may be in both low pressure fluid communication and high pressure fluid communication with the manifold system 104.

Figure 2:
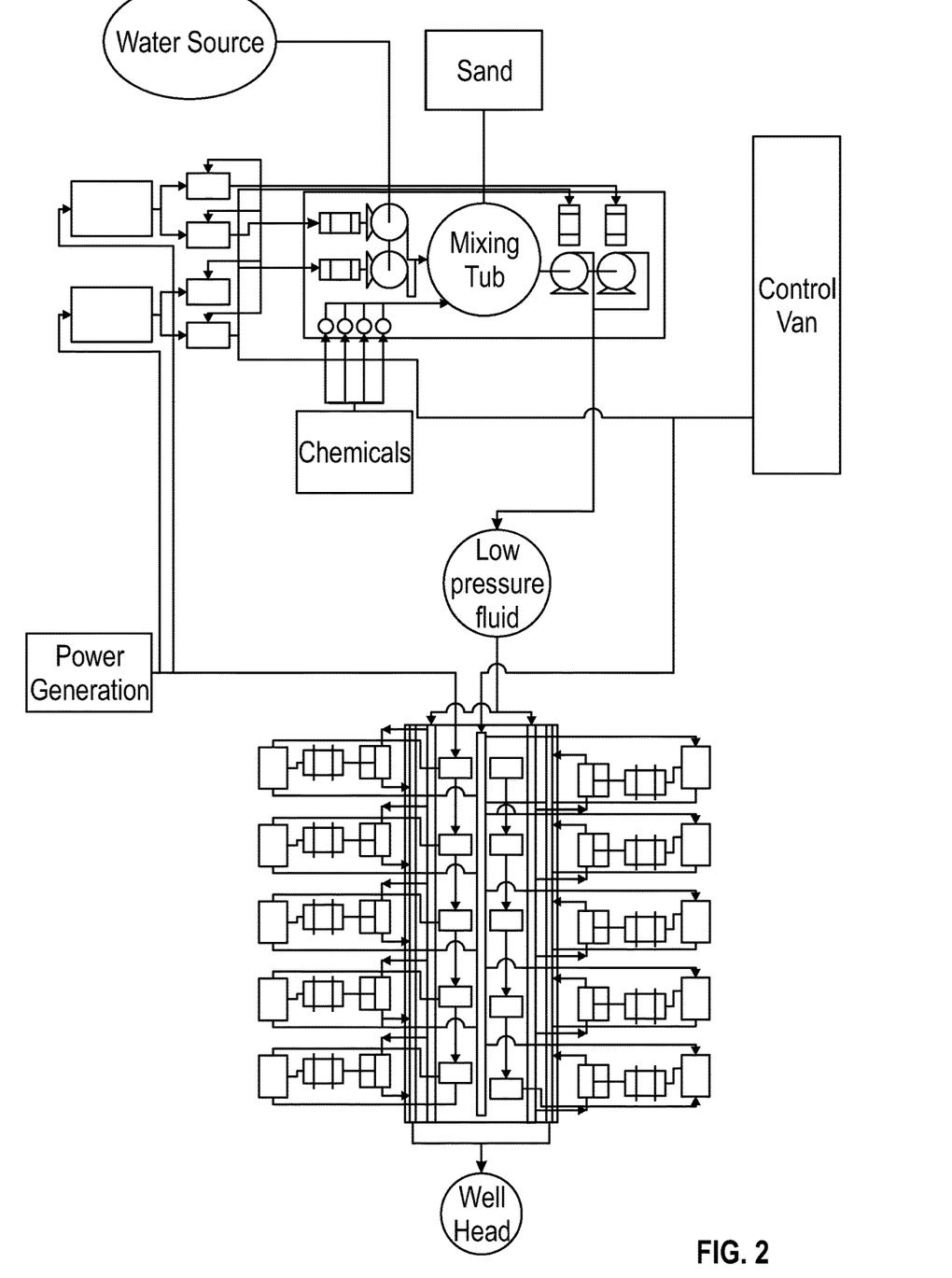
FIG. 2 is a layout where a close coupled fluid processing system is not used.

As shown in FIG. 2, one approach to transferring low pressure fluid from the processing unit to the fluid distribution system is via a series of manually handleable lines. That is, due to the volume of fluid being transferred, multiple lines may be used such that the lines are small enough to be manually handled and the lines may be flexible lines to allow for varying positions of the connected systems. To allow for the connection of multiple lines, a fluid manifold may be provided on the fluid processing side and the fluid distribution side. Due to the highly abrasive fluids being pumped at high velocities, these manifolds and lines may wear out often and need replacement. Moreover, the complicated non-laminar flows created by the manifold and separate flow lines can increase the pressure drop in the system leading to cavitation and failure of the pumps in the pressurization system. Moreover, the multiple lines arranged along the ground create logistical issues on site, create tripping hazards, and otherwise obstruct on site operations.

FIG. 3 is a schematic top down view of a close coupled fluid processing system 102. As shown, the fluid processing system 102 is more closely positioned to the fluid distribution or manifold system 104 as compared to that of FIG. 2. As shown, the large bore piping on the fluid processing system 102 may be directly connected to large bore piping on the fluid distribution system 104. A cross communication feature 120 may be provided to provide flexibility in fluid delivery from either portion of the fluid processing system. However, manifolds on each side of the fluid transfer may be omitted and the several manually handleable lines extending between the manifolds may also be omitted.

Figure 4:
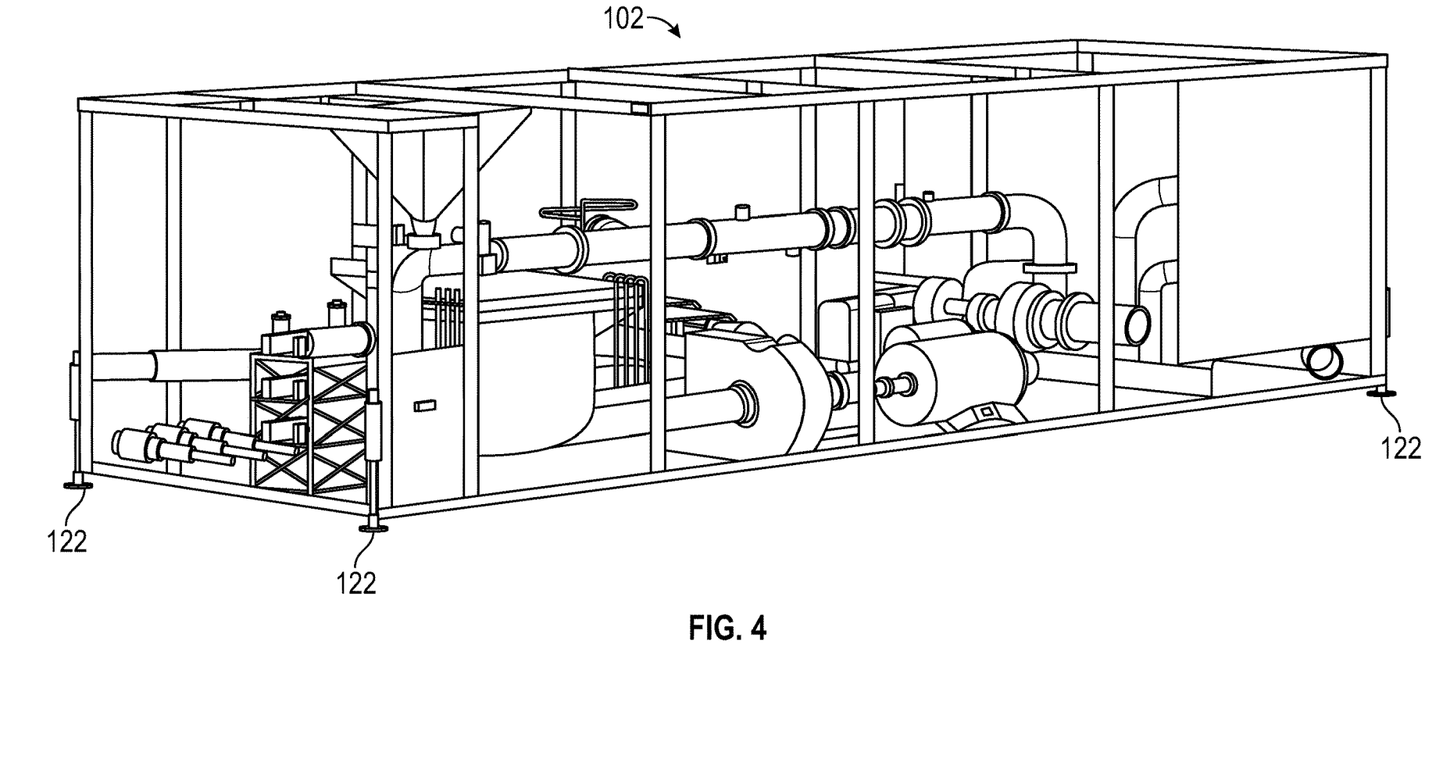
FIG. 4 is a perspective rear view of a fluid processing system adapted for close coupling to a smart manifold, according to one or more embodiments.

A more detailed view of a fluid processing system 102 is provided in FIG. 4. While multiple arrangements for fluid processing systems may be provided, the fluid processing system may generally include a water input, a chemical input, and a proppant input. The inputs may lead to a blender that functions to mix and/or blend the several inputs into a slurry. The blender may feed to a pump, which may pump the prepared fluid to the fluid distribution system. As shown, one, two, or more large bore pipes may be used to transfer the fluid to the fluid distribution system 104. In one or more embodiments, the large bore pipes may have diameters exceeding 4 inches. For example, the large bore piping may have a nominal diameter ranging from approximately 4 inches to 12 inches, or from 5 inches to 9 inches, or from 6 inches to 8 inches, for example. Still other sizes may be used.

Figure 5:
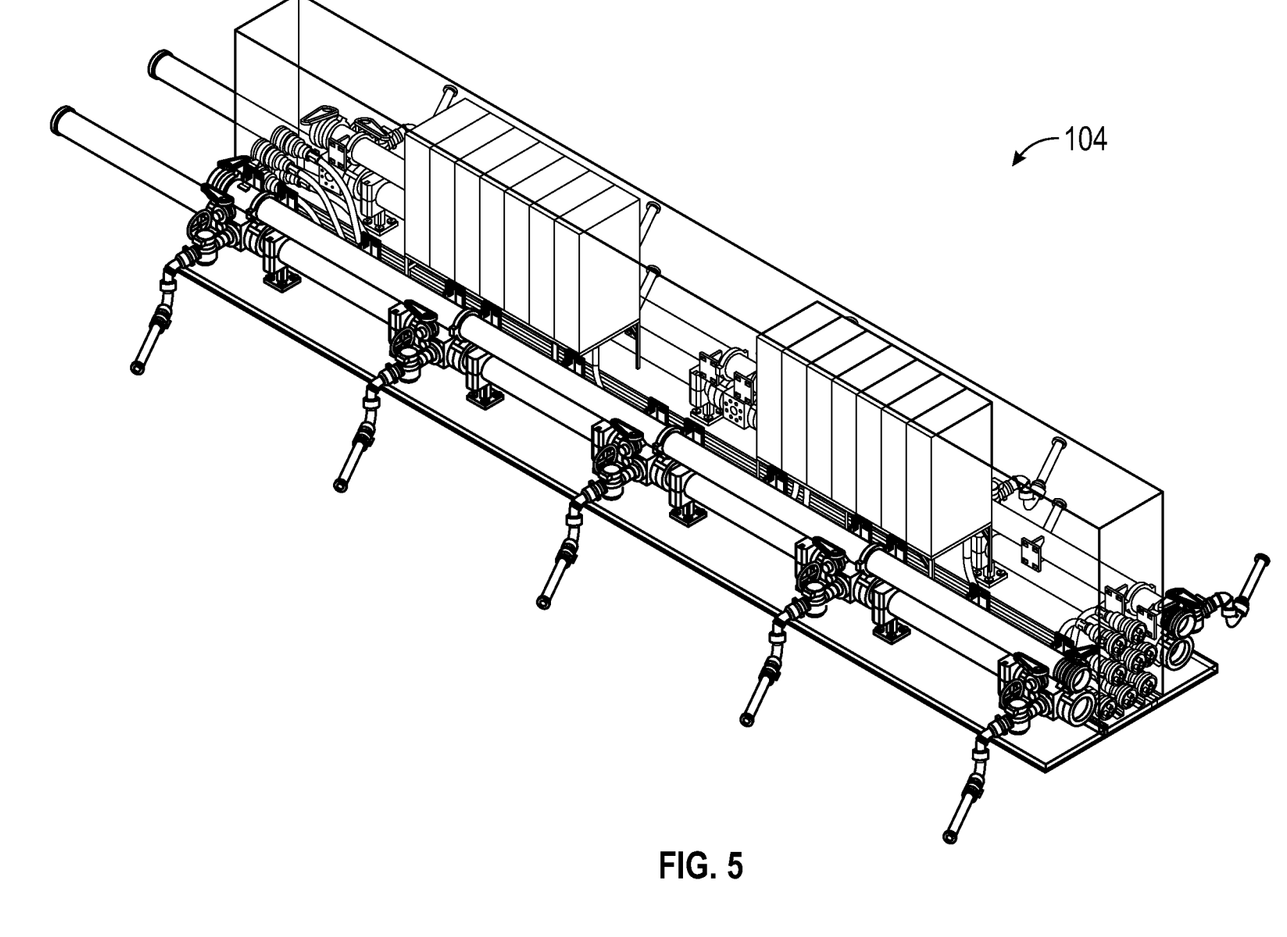
FIG. 5 is a perspective view of a smart manifold, according to one or more embodiments.

FIG. 5 shows a fluid distribution system 104 in the form of a smart manifold. The smart manifold system may receive the low pressure fluid from the fluid processing system, distribute it to a series of pressurization units 106, receive high pressure fluid from the pressurization units, and deliver the fluid to the well head 112. The smart manifold system may include a manifold system as described in U.S. patent application 62/869,455 entitled Smart Manifold and filed on Jul. 1, 2019, the content of which is hereby incorporated by reference in its entirety. While a smart manifold system with a combined fluid and power collection and distribution system is shown, the present close coupled system between the fluid processing system and the fluid distribution system may be used with power/fluid distributions systems that are separate. Nothing in this disclosure shall be construed to require that the power distribution system and the fluid distribution system be part of the same system or piece of equipment.

With this basic understanding of the several functional pieces of a frac system and the value of a large bore connection between the fluid processing system and the manifold system, the details of the connection between these systems may be described. That is, as may be appreciated, the large bore nature of the connection, the relatively stationary position of the large bore pipe on each piece of equipment, and the relatively large equipment may make alignment of the large bore piping relatively difficult. Still further, the uneven nature of the grade on which the equipment is sitting may contribute to misalignment issues. To address these issues, the fluid processing system 102 and/or the smart manifold 104 may include alignment and/or accommodation features. These features may include a vertical adjustment, a two direction vertical alignment, an angular alignment accommodator, and a connection making slip. Cross communication may be provided and a bolt less and/or automated connection system may also be provided.

Vertical Adjustment for Horizontal Alignment

As shown in FIG. 4, the processing unit 102 may include a plurality of corner supports 122 including hydraulic jacks, jack stands, or other adjustable vertical supports. The processing unit 102 may be delivered to the site and positioned as closely as possible to the fluid distribution system using a truck and trailer. For example, the truck and trailer may be able to position the processing unit in substantially correct position relative to the fluid distribution give or take 1 to 12 inches, or 3 to 9 inches, or approximately 6 inches. That is, as shown in FIG. 6, the low pressure piping ends 124 on the fluid processing system may be placed to align as closely as possible with the low pressure piping 126 on the fluid distribution system 104. In one or more embodiments, the truck and trailer may place the base of the fluid processing system such that each pipe is aligned with its adjoining pipe within 6 inches measured along the trailer and within 6 inches from the platform or base of the fluid distribution system. With the fluid processing 102 system in generally the correct position, the corner supports 122 may be actuated to lift the fluid processing system off of the deck of the trailer allowing the truck and trailer to pull away leaving the processing system 102 behind. With the processing system 102 in place, the corner supports 122 may lower the processing system 102 bring the low pressure piping into general horizontal alignment along a vertical axis. That is, the jacks may be used to lower the processing system such that the processing system piping is at approximately the same elevation above the ground as the fluid distribution piping. The jacks or other corner supports 122 may, thus, provide for vertical adjustment of the processing system relative to the fluid distribution system. It is to be appreciated that a shelf or other feature as described in more detail below may be present on the fluid distribution system that may allow the fluid processing systems downward movement to be arrested when the piping has been lowered to align with the fluid distribution piping. Alternatively or additionally, a tab, hip, or shoulder on the fluid processing system may extend outwardly over a portion of the fluid distribution system for a same or similar purpose.

Two Direction Vertical Alignment

As the fluid processing system 102 is lowered to bring it into horizontal alignment with the fluid distribution system, a vertical alignment system 128 may be provided to guide the fluid processing system sideways in two directions. That is, the vertical alignment system 128 may cause the fluid processing system to shift horizontally toward or away from the fluid distribution system and along the fluid distribution system to bring the piping into two direction vertical alignment.

Figure 7:
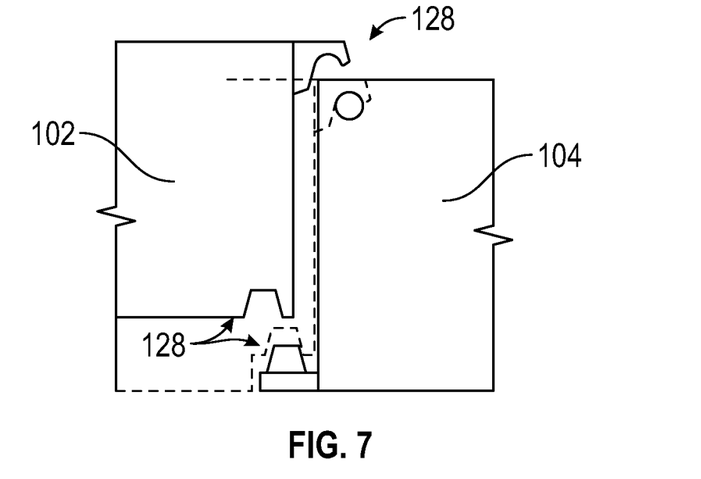
FIG. 7 is schematic side view of an equipment tolerance control feature, according to one or more embodiments.

As shown in FIG. 7, the two direction vertical alignment may include a wedging feature which relies on the downward motion of the fluid processing system and a series of wedge-shaped sloping features which urge the processing equipment laterally in two directions as the system moves downward. In FIG. 7, for example, a receiving slot may be provided on the fluid distribution system. The slot may be a substantially V-shaped slot when viewed from the side. Additionally, the fluid processing system may include a corresponding V-shaped protrusion particularly sized and adapted to engage the V-shaped slot. As shown, as the fluid processing system moves downward, the V-shaped protrusion may engage the mouth of the V-shaped slot and the corresponding sloped surfaces on the slot and the protrusion may urge the processing system laterally (e.g., the right in FIG. 7) as the processing system is lowered. One or more of these features may be provided along the height of the engaging portions of the fluid processing and distribution systems. Moreover, while the features have been shown for adjusting in the lateral direction affecting the closeness of the units, same or similar features may be used for adjusting the units along one another. In one or more embodiments, separate V-shaped features may be provided for adjusting in the orthogonal direction, or the V-shaped features shown may be conical when viewed in three dimensions to allow for adjustment in both directions using 1 feature on each piece of equipment.

It is to be appreciated that the mouths of the V-shaped or conical features may be sized to accommodate the tolerance anticipated using the truck and trailer. That is, if the truck and trailer may be expected to locate the fluid processing system at the correct location plus or minus 6 inches, then the mouth on the alignment features shown may be approximately 12 inches, for example. Other tolerance levels for the truck and trailer may be provided by adjusting the size of the two direction vertical alignment features.

Angular Alignment Accommodator

Figure 8:
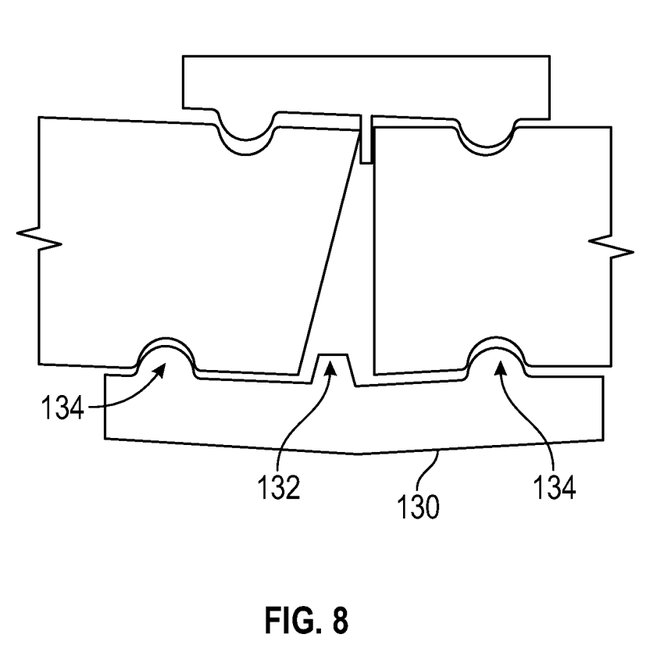
FIG. 8 is a schematic cross-sectional view of a pipe alignment seal, according to one or more embodiments.

While the above systems may provide for horizontal and two directional vertical alignment, the ground surface and other factors may cause the pipes to not be in longitudinal alignment. That is, the longitudinal axes of the pipes on the fluid processing system and the fluid distribution system may extend at slightly differing angles. As such, a common flanged pipe connection on each of the pipes may not align properly in parallel fashion. To accommodate this angular alignment issue, a pipe joint seal 130 may be provided as shown in FIG. 8. As shown, the seal may include a resilient boot for sleevably engaging the outside of each pipe on each side of the connection and for sealingly engaging the ends of each pipe. The boot may, for example, be made of a resilient material having flexibility and resiliency to seal the angularly unaligned pipe. In one or more embodiments, the seal may be substantially cylindrically shaped having an inner diameter the same as or slightly smaller than an outer diameter of the fluid piping such that it may be sleevably slipped over the pipe and snugly engage the outer wall of the pipe. The boot may include an internal rib 132 for sealing between the pipe ends. That is, the rib may be sized to extend into the space between the pipe ends and seal against the ends of each of the pipes. The rib may have a width measured along the boot that is selected to fill large gaps on one side of the joint and without being overly compressed on an opposing side of the pipe. Accordingly, the rib width may be selected based on the diameter of the pipe being sealed, the anticipated angular amounts of misalignment, and the resiliency of the material. In one or more embodiments, the rib width may range from ¼ inch to 2 inches, or from ½ inch to 1 inch, or a ¾ inch rib width may be used. The rib may extend into the joint a distance substantially equal to the pipe wall thickness. In addition, the boot may include securing ribs 134 for each pipe section. For example, a groove may be provided around the circumference of each pipe to be connected and a corresponding boot rib may be provided to engage the groove and maintain the position of the boot.

Connection Making Slip

Figure 9:
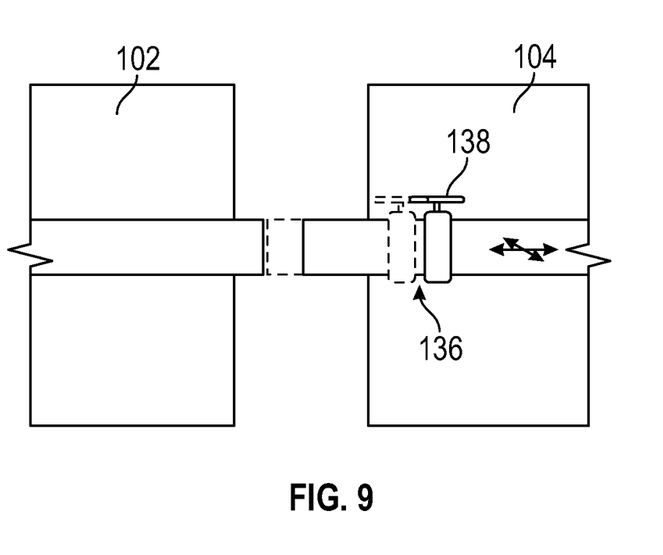
FIG. 9 is a schematic side view of a pipe tolerance control feature, according to one or more embodiments.

The connection making slip 136 may provide for drawing the pipe ends toward or away from one another to assist in making the connection. As shown in FIG. 5 and in more detail in FIG. 9, the low pressure fluid piping of the fluid distribution system may include a longitudinal movement mechanism 136 allowing the low pressure pipe to translate longitudinally along the fluid distribution system and, as such, move closer or further away from the fluid processing system. The connection making slip 136 may include hoop-like supports on the fluid distribution system that support and secure the low pressure pipe. In one or more embodiments, the hoop-like supports may be supported by a track 138 allowing the supports to translate along the track with a limited amount of longitudinal movement. In other embodiments, internal bearings, sleeves, or other slip features may be arranged on the inside of the hoop-like supports to allow the pipe to translate relative to the supports. In one or more embodiments, the low pressure pipe may be biased in a direction toward the fluid processing system using a spring or other biasing mechanism. As such, the low pressure pipe on the fluid distribution system may tend to engage the piping on the fluid processing system unless/until it is pulled away from it. Still other approaches may be used to allow for longitudinal adjustment of the low pressure piping. Moreover, while the adjustment has been said to be present on the fluid distribution side, it could also be on the fluid processing side of the connection.

Cross Communication

Figure 10:
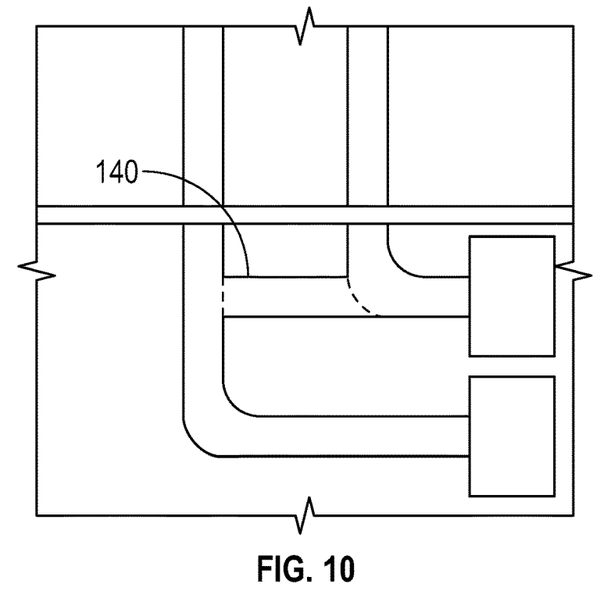
FIG. 10 is a schematic top down view of cross communication piping, according to one or more embodiments.

The close coupling of the fluid processing system and the fluid distribution system may not naturally include a manifold system as with the system in FIG. 2. As such, without more, the fluid being supplied to each side of the fluid distribution system may be provided separately from two separate aspects of the fluid processing system and the pressurization may not be equal. Moreover, to allow for flexibility where a portion of the fluid processing system is under repair, out of order, or otherwise not in use, a cross communication system 140 may be provided, which may also allow for equalization of pressure when both portions of the processing system are in use. As shown in FIG. 10, the cross communication system 140 may include a pipe extending from one fluid processing pipe to an adjacent fluid processing pipe. The cross communication piping may be valved or unvalved and, when valved, may be selectively used to allow the two supply lines of the fluid processing system to be in fluid communication.

Connection

Figure 11:
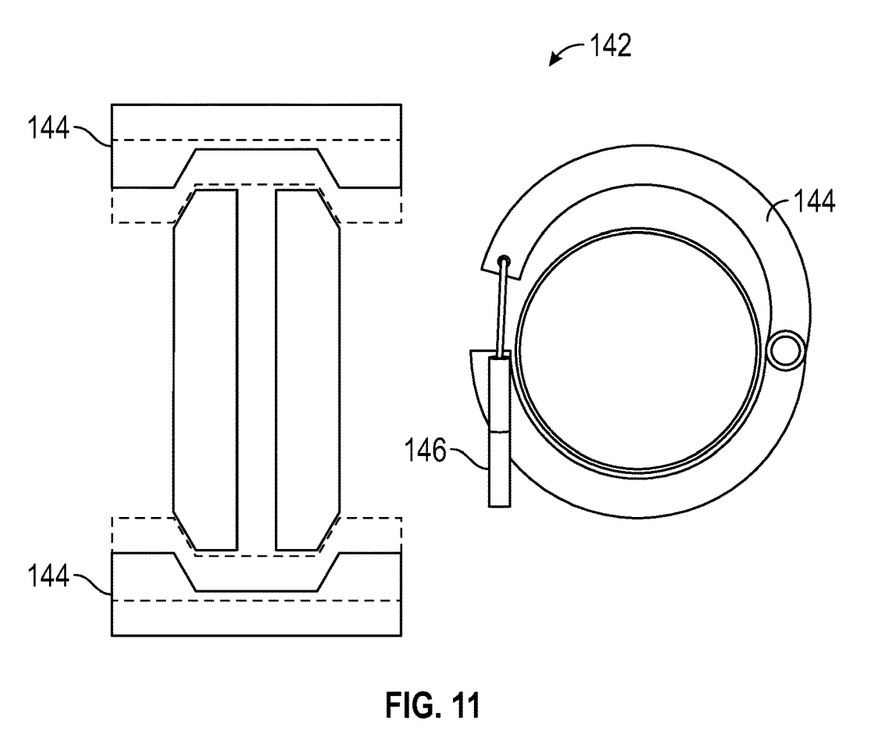
FIG. 11 is a schematic cross-sectional and end view of a pipe securing system, according to one or more embodiments.

The connection of the piping between the fluid processing system and the fluid distribution system may be provided in a bolt-less manner and/or an automated connection may be provided. That is, access between the two pieces of fluid processing and fluid distribution equipment may be relatively limited when the equipment is placed and, as such, relying on manual personnel to access the joint and assemble the joint may be relatively difficult unless the pipe systems are designed to protrude from their respective systems a relatively large distance. In light of this, a bolt-less or even automated connection 142 may be provided. As shown in FIG. 11, a collar-type clamp 144 may be provided. That is, as shown, flanges may be provided having tapered surfaces facing their respective pipes. A collar 144 may be arranged around the flanges having a corresponding tapered inner surface. The collar 144 may be in the form of a clamp having a pin on one side and a securing mechanism 146 on an opposite side. As the clamp is closed around the flanges, the tapered surfaces may draw the ends of the pipe toward one another allowing for a sealed connection. The clamp may be actuatable with a hydraulic system, screw mechanism, electric drive mechanism, or other actuation system to allow the clamp to be automatically closed when the ends of the pipe are placed within a reasonable spacing from one another.

It is to be appreciated that the bolt-less connection shown may be used in conjunction with or as an alternative to the angular alignment accommodator. For example, in one or more embodiments, an angular alignment accommodator may be used within 2, 3, or 4 feet of the end of the pipe and a pipe extension with a tapered-surface-type flange at one end for the clamp connection and a plain end at the other end for use with the angular alignment accommodator, for example.

Various embodiments of the present disclosure may be described herein with reference to flowchart illustrations and/or block diagrams of methods, apparatus (systems), and computer program products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A close coupled processing system, comprising:
   a fluid processing system for producing frac fluid for frac operations;
   a fluid distribution system for distributing the frac fluid to a plurality of pressurization units; and
   a fluid connection connecting the fluid processing system and the fluid distribution system, comprising:
   a first pipe fixed to the fluid processing system having a portion within the boundary of the fluid processing system defining a first longitudinal axis that is configured to be and remain stationary relative to the fluid processing system before, during, and after connection; and
   a second pipe fixed to the fluid distribution system having a portion within the boundary of the fluid distribution system defining a second longitudinal axis that is configured to be and remain stationary relative to the fluid distribution system before, during, and after connection;
   wherein the first and second pipes are configured for direct connection to one another, wherein the first axis is configured to be aligned with the second axis.

2. The close coupled processing system of claim 1, wherein the fluid connection comprises no more than two fluid connections.

3. The close coupled processing system of claim 2, further comprising a cross communication system.

4. The close coupled processing system of claim 1, wherein the fluid connection carries a same amount of fluid as multiple parallel human handleable hoses.

5. The close coupled processing system of claim 1, wherein the fluid processing system is configured for 3-axis alignment with the fluid distribution system.

6. The system of claim 5, further comprising a vertical adjustment mechanism on at least one of the fluid processing system and the fluid distribution system.

7. The system of claim 6, further comprising a two-direction vertical alignment mechanism.

8. The system of claim 1, further comprising a cross communication system.

9. The system of claim 1, wherein the connection is a boltless connection.

10. The system of claim 9, wherein the boltless connection is an automated connection.

11. A frac system, comprising:
    a fluid processing system for producing frac fluid for frac operations;
    a fluid distribution system for distributing the frac fluid to a plurality of pressurization units;
    a fluid connection connecting the fluid processing system and the fluid distribution system, comprising:
    a first pipe fixed to the fluid processing system having a portion within the boundary of the fluid processing system defining a first longitudinal axis that is configured to be and remain stationary relative to the fluid processing system before, during, and after connection; and
    a second pipe fixed to the fluid distribution system having a portion within the boundary of the fluid distribution system defining a second longitudinal axis that is configured to be and remain stationary relative to the fluid distribution system before, during, and after connection;
    wherein the first and second pipes are configured for direct connection to one another, wherein the first axis is configured to be aligned with the second axis;
    a power distribution system for distributing power to the plurality of pressurization units; and
    the plurality of pressurization units, wherein the pressurization units are configured to pressurize the frac fluid and deliver the frac fluid to a wellhead.

12. The frac system of claim 11, wherein the fluid distribution system and power distribution system are a combined system.

13. The frac system of claim 11, wherein the fluid processing system is configured for 3-axis alignment with the fluid distribution system.

14. The system of claim 13, further comprising a vertical adjustment mechanism on at least one of the fluid processing system and the fluid distribution system.

15. The system of claim 14, further comprising a two-direction vertical alignment mechanism.

16. The system of claim 11, further comprising a cross communication system.

17. The system of claim 11, wherein the connection is a boltless connection.

18. The system of claim 17, wherein the boltless connection is an automated connection.

* * * * *